United States Patent [19]

Bortnick et al.

[11] Patent Number: 5,066,696

[45] Date of Patent: Nov. 19, 1991

[54] POLYMERS STABILIZED AGAINST LIGHT AND HEAT DEGRADATION

[75] Inventors: Newman M. Bortnick, Oreland; Robert A. Wanat, Langhorne; Darnel Degraff, Bensalem, all of Pa.

[73] Assignee: Rohm and Haas Company, Philadelphia, Pa.

[21] Appl. No.: 478,807

[22] Filed: Feb. 12, 1990

[51] Int. Cl.$^5$ ............................................ C08K 5/0492
[52] U.S. Cl. ...................................... 524/91; 524/100
[58] Field of Search ................................... 524/91, 100

[56]  References Cited

U.S. PATENT DOCUMENTS

| 3,230,194 | 1/1966  | Boyle ................................. 524/91 |
| 3,576,805 | 4/1971  | Cantrall et al. ..................... 544/182 |
| 3,577,417 | 5/1971  | Cantrall et al. ..................... 544/182 |
| 3,591,693 | 7/1971  | Cantrall et al. ..................... 424/249 |
| 4,086,204 | 4/1978  | Cassandrini et al. ............... 544/182 |
| 4,348,493 | 9/1982  | Loffelman .......................... 524/100 |
| 4,404,293 | 9/1983  | Cigna et al. ....................... 524/100 |
| 4,418,000 | 11/1983 | Zannucci et al. .................. 252/403 |
| 4,459,395 | 7/1984  | Cantatore .......................... 524/100 |
| 4,692,486 | 9/1987  | Gugumus ........................... 524/100 |

FOREIGN PATENT DOCUMENTS 227640 9/1983 Fed. Rep. of Germany .

OTHER PUBLICATIONS

Chimassorb TM 944 LD, "Hindered Amine Light Stabilizer for Polyolefins", Ciba–Geigy, 1985.

Primary Examiner—Kriellion S. Morgan
Attorney, Agent, or Firm—Roger K. Graham; John E. Taylor, III

[57] ABSTRACT

Tertiary-alkyl-substituted melamines stabilize certain polymers against the deleterious effects of light and heat.

38 Claims, No Drawings

POLYMERS STABILIZED AGAINST LIGHT AND HEAT DEGRADATION

This invention relates to light-stabilized and heat-stabilized polymer compositions. More particularly it relates to polymer compositions so stabilized with t-alkylmelamines.

BACKGROUND OF THE INVENTION

Organic polymers undergo degradation in the presence of light and heat, and this degradation is accelerated when the intensity of the light and the temperature are both high. The light which causes the degradation ranges in wavelength from the infrared through the visible into the ultraviolet, with the shorter wavelengths, i.e., the ultraviolet, causing the greatest degradation. This problem is especially severe in luminaires, where both heat and light are intense, but it is troublesome in many other applications where polymers are exposed to natural or artificial light and heat.

Stabilizers against the degrading effects of light are known, and include polymeric hindered amines and melamines with highly aromatic substitution. Such stabilizers are expensive and difficult to prepare, and they fail to offer effective protection against the effects of heat. For example, poly((6-(1,1,3,3-tetramethylbutyl)amino)-s-triazine-2,4-diyl)(((2,2,6,6-tetramethyl-4-piperidyl)imino)hexamethylene((2,2,6,6-tetramethyl-4-piperidyl)imino)), a commonly used hindered-amine light stabilizer sold under the trademark Chimasorb 944 LD, significantly degrades the thermal stability of poly(vinyl chloride).

SUMMARY OF THE INVENTION

We have discovered that tertiary-alkyl-substituted melamines having the formula

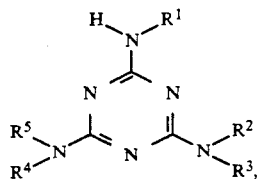

where $R^1$ is a $C_4$–$C_{18}$ tertiary alkyl and $R^2$–$R^5$ are selected from the same or different $C_1$–$C_{18}$ straight- or branched-chain alkyls and hydrogen, provides stabilization against the effects of both heat and light, and we further have discovered polymer compositions susceptible to degradation in the presence of heat and/or light which have been stabilized against such degradation with a stabilizing amount of this alkyl-substituted melamine.

DETAILED DESCRIPTION OF THE INVENTION

The term "melamine" as used herein means 2,4,6-triamino-symtriazine, which has the structural formula shown above, in which each of $R^1$–$R^5$ is hydrogen. The terms "(meth)acrylic" and "(meth)acrylate", as used herein, indicate both acrylic and methacrylic, and both acrylate and methacrylate, respectively.

The tertiary-alkyl-substituted melamines useful in the present invention are those melamines represented by the above-defined structural formula, having at least one tertiary-alkyl substituent which contains from 4 to 18 carbon atoms, the tertiary carbon being bonded to the melamine nitrogen, as for example t-butyl; 1,1-dimethylpropyl; 1-methyl-1-ethylpropyl, 1,1-dimethylbutyl; 1,1,2-trimethylbutyl; 1,1,3-trimethylbutyl; 1,1,2,3-tetramethylbutyl; 1,1-dimethyl-2-ethylbutyl; 1,2-dimethyl-1-ethylbutyl; 1,3-dimethyl-1-ethylbutyl; 1,1,2-trimethylpentyl; 1,1,2,3-tetramethylpentyl; 1,1,dimethyl-2-ethylpentyl; 1,1-dimethyl-3-ethylpentyl; 1,3,4-trimethyl-1-ethylpentyl; 1,1,2,3-tetramethylhexyl; 1,1,4,-trimethyl-2-ethylhexyl; 1,2,3-trimethyl-1-ethylhexyl; 1,2-dimethyl-1-propylhexyl; 1,1,3-triethyl-2,4-dimethylhexyl and the like.

Preferred for the t-alkyl substituents are those containing from 4 to 14 carbon atoms, and more preferred are those containing 8 carbon atoms. Especially preferred is 1,1,3,3-tetramethylbutyl. The term "t-octyl" as used herein means 1,1,3,3-tetramethylbutyl.

The preferred substituents to the melamine at $R^2$ and $R^4$ in the structural formula above include the t-alkyl substituents described above, in which case $R^3$ and $R^5$ are hydrogen. Substituents at $R^2$–$R^5$ may also include hydrogen and straight- or branched-chain alkyl groups having 1 to 18 carbon atoms, including methyl; ethyl; propyl; isopropyl; butyl; isobutyl; branched or unbranched pentyl, hexyl, heptyl, octyl, nonyl, decyl, undecyl, dodecyl, tridecyl, tetradecyl, pentadecyl, hexadecyl, heptadecyl and octadecyl; and corresponding alkylene groups having 2 to 18 carbon atoms. Preferred alkyl groups, apart from the above-described t-alkyl substituents, are those having from one to fourteen carbon atoms, and more preferred are those groups having from one to eight carbon atoms.

The preferred t-alkyl-substituted melamines are those which are mono- and tri-substituted with the 1,1,3,3-tetramethylbutyl group; particularly preferred is tris-(1,1,3,3-tetramethylbutyl)melamine.

The polymers stabilized against light and heat degradation by incorporation of the t-alkyl-substituted melamine stabilizer include polymers of one or more of (meth)acrylic esters and acids, such as methyl acrylate, methyl methacrylate, methacrylic acid, ethyl acrylate and the like; styrene and lower-alkyl-substituted styrenes where the lower-alkyl substituents are from one to three of the same or different $C_1$–$C_4$ alkyl groups, such as α-methylstyrene and the like; vinyl halides such as vinyl chloride; poly(dimethyl)glutarimides such as poly(N-methyldimethylglutarimide) and copolymers of one or more of the above monomers with polyglutarimides; and polymer blends of two or more of the above polymers, the components of the polymer blend preferably being compatible with one another. Transparent, translucent and opaque polymers are stabilized against light and heat degradation by incorporation of the t-alkyl-substituted melamine stabilizers, although transparent polymers benefit most from such stabilization.

The stabilized polymers may include other additives known to those skilled in the art, such as fillers, pigments, tints, dyes, impact-resistance modifiers, antistatic agents, antioxidants, ultraviolet-light absorbers, stabilizers against ultraviolet light, lubricants, processing aids and the like.

We have found that combining the t-alkyl-substituted melamine stabilizers of the present invention with ultraviolet-light absorbers known in the art produces a surprising improvement in resistance to yellowing upon exposure of the stabilized polymer to ultraviolet light. Such combinations have been observed to resist yellowing better than one would expect from adding the effects of the t-alkyl-substituted melamine stabilizer alone and the ultraviolet-light absorber alone, at comparable loading levels in the stabilized polymer. Consequently, such combinations of the t-alkyl-substituted melamine stabilizers of the present invention with ultraviolet-light absorbers are also included within the present invention. Particularly preferred are benzotriazole ultraviolet-light absorbers, and more particularly preferred is 2-(2-hydroxy-5-t-octylphenyl)-benzotriazole. The preferred amount of ultraviolet-light absorber is from about 0.05 to about 0.5%, based on the total weight of the polymer composition.

The amount of the t-alkyl-substituted melamine stabilizer preferred for stabilizing polymers against light and heat degradation is from about 0.05 to about 0.5% by weight, and more preferably from about 0.1 to about 0.3% by weight. Smaller amounts than about 0.05% may be used, but the stabilizing effect is small and may not be observable. Larger amounts than about 0.5% may also be used, but the increase in stabilizing effect is relatively small for a given increase in the amount of t-alkyl-substituted melamine stabilizer beyond about 0.5%, and consequently adding more than this amount of the stabilizer is relatively inefficient.

The t-alkyl-substituted melamine stabilizers of the present invention may be incorporated into the above polymers by adding them to the monomers prior to polymerization, adding them to polymers prior to further processing, adding them to melted polymer during processing, as by adding them to the polymer in an extruder, adding them to a polymer latex and subsequently isolating the polymer by techniques known to those skilled in the art, including spray drying, coagulation or extrusion from a devolatilizing extruder, and by otherwise incorporating them into polymers using processes which will readily occur to those skilled in the art.

Alkyl-substituted melamines are known in the art, having been used, among other things, for their antimicrobial activity. The preparation of alkylmelamines is also known in the art; they may readily be prepared, for example, by reacting cyanuric chloride with the appropriate alkylamine according to the following reaction:

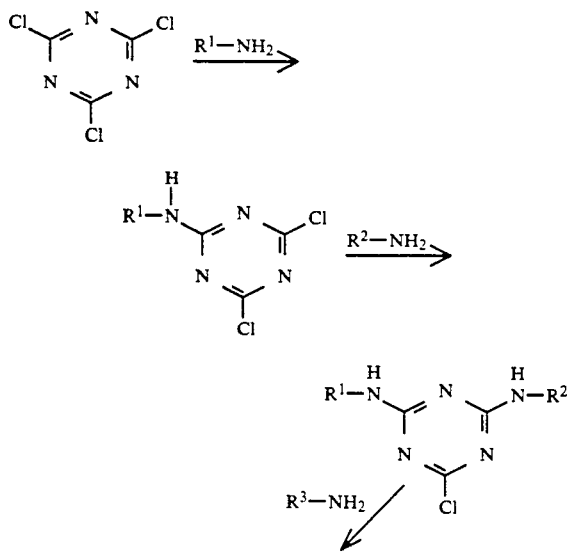

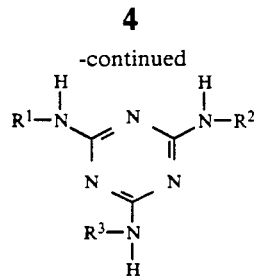

Where $R^1$, $R^2$ and $R^3$ are all different, the alkylamino groups may be substituted stepwise at the 2-, 4- and 6-positions, using equimolar amounts of alkylamine or ammonia with cyanuric chloride or the 2,4-dichloro-6-alkylamino-s-triazine in the first two steps, and an excess of alkylamine or ammonia with the resulting 2-chloro-4,6-bis(alkylamino)-s-triazine in the final step. Where two of the alkyl substituents are the same, two moles of alkylamine may be used for each mole of cyanuric chloride in the first step, and an excess of the other alkylamine or ammonia in the final step. Where the alkyl substituents are all the same, an excess of the alkylamine with the cyanuric acid may be used in a single step. The reaction may be carried out in a suitable inert solvent such as toluene or xylene at temperatures from about 25° C. to about 200° C. for times from about 3 to about 24 hours. Reaction times and temperatures may be selected appropriately for the reactivity of the alkylamine with the cyanuric chloride or intermediate; n-alkylamines react most readily, while tertiary alkylamines react with difficulty. Where one or two moles of alkylamine are used per mole of cyanuric chloride or intermediate, an acid scavenger may be employed for the hydrochloric acid liberated by the reaction; this may be sodium bicarbonate or carbonate, or a tertiary amine such as diisopropylethylamine.

Polymers stabilized by incorporating into them the t-alkyl-substituted melamine stabilizers of the present invention are particularly suited for use in applications where they are exposed to high temperatures and intense light levels, especially intense levels of ultraviolet light. Such applications include lenses, housings, light pipes and other parts of luminaires, especially high-intensity luminaires such as electric arc lights, metal vapor lights and the like. Other applications include transparent sheets and films, panels for illuminated signs, automotive parts such as taillight lenses, headlight lenses, canopies, sun roofs and skylights, building items such as skylights, and office supplies and equipment such as computer and office machine housings and the like. Another application is for surface protection of non-light-stable or non-heat-stable polymers such as acrylonitrile-butadiene-styrene (ABS) polymers and non-stabilized poly(vinyl chloride); the surface protection may take the form of capstock (a surface layer co-extruded with the non-stable polymer) or laminates (a surface layer that is formed as a separate film or sheet and subsequently bonded to a pre-formed film or sheet of the non-stable polymer).

The following examples are intended to illustrate the invention. All percentages are by weight unless otherwise indicated, and all reagents are of good commercial quality, unless otherwise indicated.

The yellowness index was determined according to ASTM method D1925, and oven ageing was determined by placing the polymer in an air-circulating oven at the temperatures specified. Humidity was not controlled during the oven-ageing test.

The substituted melamines were introduced into samples designated "extruded" in the examples by adding them to the polymer in a 2.5-cm Killion extruder, and extruding the polymer into strands; for the samples designated "cast", the samples were introduced into a monomer mixture of 97% methyl methacrylate and 3% ethyl acrylate by dissolving 0.1% of the substituted melamine in the monomer mixture and polymerizing the monomer mixture using a temperature profile of 65° C. for 24 hours, followed by one hour at 70° C., one hour at 80° C. and two hours at 120° C.

The light stabilizers used in the comparative examples are poly((6-(1,1,3,3-tetramethylbutyl)amino)-s-triazine-2,4-diyl)(((2,2,6,6-tetramethyl-4-piperidyl)imino)-hexamethylene((2,2,6,6-tetramethyl-4-piperidyl-)imino)), CAS Reg. No. 70624-18-9, referred to in the following tables as "LS-1"; bis(2,2,6,6-tetramethyl-4-piperidinyl)decanedioate, referred to in the following tables as "LS-2"; bis(3,5-di-tertiary-butyl-4-hydroxybenzyl) malonic acid bis (1-acetyl 2,2,6,6-tetramethyl-4-piperidinyl) ester referred to in the following tables as "LS-3"; and 2(2'-hydroxy-5'-methylphenyl)benzotriazole, referred to in the following tables as "LS-4".

EXAMPLES

EXAMPLES 1-4

These examples illustrate the effect of the stabilizers of the present invention and commercial light stabilizers on the light and heat resistance of imide-containing polymers. As may be seen from Table I, the yellowing on light exposure of samples containing the t-alkyl-substituted melamines of the present invention (Example 2) was better than that for the non-stabilized control (Example 1), and better than or equal to that of samples containing the commercial light stabilizers (Examples 3 and 4), while the yellowing on heating for the samples of the present invention was significantly better than that for both controls and samples containing the commercial stabilizer. The yellowing on heating for the samples containing commercial stabilizer was worse than that for the control.

The t-alkyl-substituted melamine used in Example 2 was tris(1,1,3,3-tetramethylbutyl)melamine, and the imide-containing polymer was a low-acid, low-anhydride poly(methyl methacrylate)-poly(N-methyl dimethylglutarimide) copolymer containing approximately 77% by weight of the poly(N-methyl dimethylglutarimide), having a softening temperature, as measured by ASTM Standard Method 1525-65T at 1-mm penetration and heating rate B, of 145° C., and containing 0.20% stearyl alcohol and 0.25% 2-(2-hydroxy-5-t-octylphenyl)-benzotriazole. The t-alkyl-substituted melamine was incorporated into the imide-containing polymer at a level of 0.20% by weight, using the procedure described above for extruded samples. The polymer of Example 1 was the same polymer as that of Example 2, but with no t-alkyl-substituted melamine. The polymers of Examples 3 and 4 were the same polymer as that of Example 1, but with 0.25% of LS-1 and LS-2 stabilizers, respectively, incorporated using the same procedure as for Example 2. The high-intensity light exposure tests were conducted by revolving 5-cm×7.6-cm×3.2-mm test pieces of the polymer around a 400-watt, clear mercury vapor lamp at a distance of 15 cm from the center of the lamp, and the heat exposure was conducted using the oven ageing test described above and a temperature of 130° C.

TABLE I

| Exposure (hours) | Example 1 Control | Example 2 Present Invention | Example 3 LS-1 | Example 4 LS-2 |
|---|---|---|---|---|
| Yellowing on Light Exposure | | | | |
| 0 | 2.84 | 3.74 | 4.78 | 3.97 |
| 250 | 3.61 | 2.91 | 3.11 | 3.94 |
| 500 | 10.65 | 4.93 | 8.68 | 4.86 |
| 750 | 9.10 | 4.45 | 5.29 | 4.47 |
| Yellowing on Heat Exposure | | | | |
| 0 | 2.84 | 3.74 | 4.78 | 3.97 |
| 4 | 7.88 | 7.07 | 13.95 | 15.56 |
| 7 | 14.88 | 8.54 | 15.91 | 17.33 |

EXAMPLES 5-8

These examples illustrate the effect of the stabilizers of the present invention and commercial light stabilizers on the light resistance of a commercially-sold, impact-resistance-modified acrylic polymer containing a methyl methacrylate/ethyl acrylate copolymer and a butyl acrylate/styrene rubber phase//methyl methacrylate hard phase, grafted multi-stage polymer as the impact-resistance modifier component.

As described above for extruded samples, the t-alkyl-substituted melamine of Example 2 above was incorporated at the 0.1% level into the impact-modified acrylic polymer described above, to prepare the polymer of Example 6. The polymer of Example 5 was the acrylic polymer with no added stabilizer. The polymer of Example 7 contained 0.1% of LS-3, and that of Example 8 contained 0.075% of LS-4, each incorporated into the acrylic polymer as described for Example 6. The samples were exposed to high-intensity light according to the xenon arc exposure of ASTM Standard Method D2565, modified as follows: each 2-hour cycle was divided into an 80-minute period of light exposure and a 40-minute period of light exposure plus a spray of distilled water onto the sample surface. The exposure apparatus used was an Atlas 6500-watt Xenon Arc Weatherometer TM Model C265. The results of yellowness-index determinations on the samples are shown in Table II below.

TABLE II

| | Yellowing on Light Exposure | | | |
|---|---|---|---|---|
| Exposure (hours) | Example 5 Control | Example 6 Present Invention | Example 7 LS-3 | Example 8 LS-4 |
| 0 | 2.8 | 3.7 | 3.2 | 2.0 |
| 2000 | 6.4 | 5.8 | 5.2 | 3.4 |

EXAMPLES 9-12

These examples illustrate the effect of the stabilizers of the present invention and commercial light stabilizers on the light resistance of a terpolymer of methyl methacrylate/α-methylstyrene/ethyl acrylate having a weight ratio of 73.5/24.5/2 and a weight-average molecular weight 115,000.

As described above for the extruded samples of Examples 5-8, the t-alkyl-substituted melamine of Example 2 above was incorporated at the 0.1% level into the terpolymer described above, to prepare the polymer of Example 10. The polymer of Example 9 was the terpolymer with no added stabilizer. The polymer of Example 11 contained 0.1% of LS-3, and that of Example 12 contained 0.1% of LS-4, each incorporated into the terpolymer as described for Example 10. The samples were exposed to high-intensity light as described above for Examples 5-8, and the results of yellowness-index determinations on the samples are shown in Table III below.

TABLE III

| | Yellowing on Light Exposure | | | |
|---|---|---|---|---|
| Exposure (hours) | Example 9 Control | Example 10 Present Invention | Example 11 LS-3 | Example 12 LS-4 |
| 0 | 5.4 | 2.4 | 2.7 | 3.0 |
| 500 | 5.9 | 3.3 | 4.0 | 3.7 |
| 1000 | — | 3.7 | 4.6 | 4.6 |

EXAMPLES 13-16

These examples illustrate the effect of combining the t-alkyl-substituted melamine stabilizers of the present invention with ultraviolet absorbers in a glutarimide polymer matrix. The matrix polymer was a low-acid, low-anhydride poly(methyl methacrylate)-poly(N-methyl dimethylglutarimide) copolymer containing approximately 77% by weight of the poly(N-methyl dimethylglutarimide) and having a softening temperature, as measured by ASTM Standard Method 1525-65T at 1-mm penetration and heating rate B, of 145° C. The control in this set of examples, Example 13, was the matrix polymer alone, extruded and molded into test pieces in the same manner as the following materials containing the absorber and the stabilizer. Example 14 contained 0.20 parts of 2-(2-hydroxy-5-t-octylphenyl)-benzotriazole ultraviolet light absorber per hundred parts of matrix polymer, Example 15 contained 0.20 parts of the t-alkyl-substituted melamine of Example 2 per hundred parts of the matrix polymer, and Example 16 contained 0.20 parts of the benzotriazole of Example 14 plus 0.20 parts of the t-alkyl-substituted melamine of Example 2 per hundred parts of matrix polymer. The samples were exposed as 5-cm×7.6-cm×3.2-mm molded test pieces at a distance of 15 cm from the center of a 400-watt, metal halide lamp; the samples were maintained at a temperature of 110° C. during the exposure, and the yellowness index was determined as indicated above. The results of the tests, for exposure times of 15-22 weeks, are shown in Table IV, below. As may be seen, the yellowness index is less (i.e, less yellow, or improved) for samples containing the t-alkyl-substituted melamine and the ultraviolet absorber, when compared to the expected yellowness index obtained by adding the yellowness improvement of the individual components to the yellowness index of the control polymer. The calculation used to determine the expected yellowness index of the combination at any given time was: Expected Value=(Value with melamine)+(Value with UV Absorber)−(Control). This calculation assumes a linear response of the yellowness value to changes in concentration of the two additives. Further, the superiority of the combination over the expected value increases with increased length of exposure.

TABLE IV

| | Yellowness Index after Accelerated Ultraviolet Light Exposure | | | | |
|---|---|---|---|---|---|
| Weeks | Example 13 Control | Example 14 UV Absorber | Example 15 Present Stabilizer | Example 16 Present Stabilizer + UV Absorber | Expected Value with Present Stabilizer + Absorber |
| 15.00 | 14.29 | 9.63 | 8.71 | 4.28 | 4.05 |
| 17.00 | 15.04 | 10.24 | 9.64 | 4.50 | 4.84 |
| 18.00 | 16.74 | 10.52 | 11.10 | 4.69 | 4.88 |
| 19.00 | 15.32 | 10.52 | 11.47 | 4.68 | 6.67 |
| 22.00 | 14.80 | 13.89 | 12.80 | 5.74 | 11.89 |

What is claimed is:

1. A polymer composition stabilized against heat and/or light selected from the group consisting of a polymers of:
   a) one or more (meth)acrylic esters and acids;
   b) a vinyl halide; or
   c) blends of the above polymers;
and an effective stabilizing amount of a tertiary-alkyl-substituted melamine having the formula

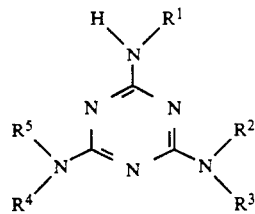

where $R^1$ is a $C_4$-$C_{18}$ tertiary alkyl and $R^2$-$R^5$ are selected from the same or different $C_1$-$C_{18}$ straight- or branched-chain alkyls and hydrogen.

2. A polymer composition stabilized against heat and/or light comprising one or more poly(dimethylglutarimides) and an effective stabilizing amount of a tertiary-alkyl-substituted melamine having the formula

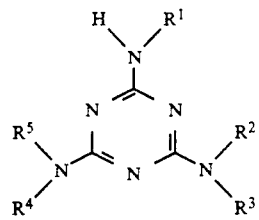

where $R^1$ is a $C_4$-$C_{18}$ tertiary alkyl and $R^2$-$R^5$ are selected from the same or different $C_1$-$C_{18}$ straight- or branched-chain alkyls and hydrogen.

3. The polymer composition of claims 1 or 2 wherein $R^1$ is a $C_4$-$C_{14}$ tertiary alkyl and $R^2$-$R^5$ are selected from the same or different $C_1$-$C_{14}$ straight- or branched-chain alkyls and hydrogen.

4. The polymer composition of claim 3 wherein $R^2$ and $R^4$ are selected from the same or different $C_1$-$C_{14}$ straight- or branched-chain alkyl and hydrogen, and $R^3$ and $R^5$ are hydrogen.

5. The polymer composition of claim 2 wherein $R^1$ is a $C_8$ tertiary alkyl and $R^2$ and $R^4$ are selected from the same or different $C_8$ tertiary alkyl and hydrogen.

6. The polymer composition of claim 5 wherein $R^1$, $R^2$ and $R^4$ are 1,1,3,3-tetramethylbutyl.

7. The polymer composition of claim 5 wherein $R^1$ is 1,1,3,3-tetramethylbutyl and $R^2$ and $R^4$ are hydrogen.

8. The polymer composition of claims 1 or 2 additionally containing an ultraviolet light absorber.

9. The polymer composition of claim 7 additionally containing an ultraviolet light absorber.

10. The polymer composition of claim 8 wherein the ultraviolet-light absorber is a benzotriazole ultraviolet-light absorber.

11. The polymer composition of claim 10 wherein the benzotriazole ultraviolet-light absorber is 2-(2-hydroxy-5-t-octylphenyl)-benzotriazole.

12. The polymer composition of claims 1 or 2 wherein the stabilizing amount of tertiary-alkyl-substituted melamine is from about 0.05 to about 0.5% by weight of the total polymer composition.

13. The polymer composition of claim 12 wherein the stabilizing amount of tertiary-alkyl-substituted melamine is from about 0.1 to about 0.3% by weight of the total polymer composition.

14. The polymer composition of claim 12 additionally containing an ultraviolet-light absorber in an amount from about 0.05 to about 0.5% by weight of the total polymer composition.

15. A manufactured article comprising the polymer composition of claims 1 or 2 in the form of a sheet or film.

16. The article of claim 15 in the form of a lens for a luminaire.

17. The article of claim 16 wherein the luminaire is a high-intensity-light luminaire.

18. The article of claim 17 wherein the luminaire is an electric-arc-light luminaire.

19. The article of claim 17 wherein the luminaire is a metal-vapor-light luminaire.

20. An article comprising the polymer composition of claims 1 or 2 in the form of a housing for a luminaire.

21. The article of claim 20 wherein the luminaire is a high-intensity-light luminaire.

22. The article of claim 20 wherein the luminaire is an electric-arc-light luminaire.

23. The article of claim 20 wherein the luminaire is a metal-vapor-light luminaire.

24. A process for stabilizing polymers against the deleterious effects of light and heat which comprises combining a polymer selected from the group consisting of:
 a) one or more (meth)acrylic esters and acids;
 b) a vinyl halide;
 c) or blends of the above polymers;
with an effective stabilizing amount of a tertiary-alkyl-substituted melamine having the formula

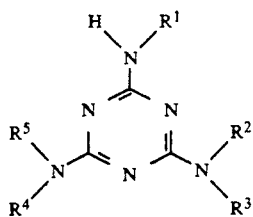

where $R^1$ is a $C_4$–$C_{18}$ tertiary alkyl and $R^2$–$R^5$ are selected from the same or different $C_1$–$C_{18}$ straight- or branched-chain alkyls and hydrogen.

25. A process for stabilizing polymers against the deleterious effects of light and heat which comprises combining a polymer comprising one or more poly(-dimethylglutarimides) and an effective stabilizing amount of a tertiary-alkyl-substituted melamine having the formula

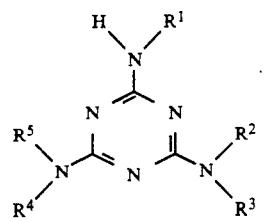

where $R^1$ is a $C_4$–$C_{18}$ tertiary alkyl and $R^2$–$R^5$ are selected from the same or different $C_1$–$C_{18}$ straight- or branched-chain alkyls and hydrogen.

26. The process of claims 24 or 25 wherein $R^1$ is a $C_4$–$C_{14}$ tertiary alkyl and $R^2$–$R^5$ are selected from the same or different $C_1$–$C_{14}$ straight- or branched-chain alkyls and hydrogen.

27. The process of claim 26 wherein $R^2$ and $R^4$ are selected from the same or different $C_1$–$C_{14}$ straight- or branched-chain alkyl and hydrogen, and $R^3$ and $R^5$ are hydrogen.

28. The process of claim 27 wherein $R^1$ is a $C_8$ tertiary alkyl and $R^2$ and $R^4$ are selected from the same or different $C_8$ tertiary alkyl and hydrogen.

29. The process of claim 28 wherein $R^1$, $R^2$ and $R^4$ are 1,1,3,3-tetramethylbutyl.

30. The process of claim 28 wherein $R^1$ is 1,1,3,3-tetramethylbutyl and $R^2$ and $R^4$ are hydrogen.

31. The process of claim 24 wherein the stabilizing amount of tertiary-alkyl-substituted melamine is from about 0.05 to about 0.5% by weight of the total polymer composition.

32. The process of claim 24 wherein the stabilizing amount of tertiary-alkyl-substituted melamine is from about 0.1 to about 0.3% by weight of the total polymer composition.

33. The process of claim 24 wherein the polymer is further combined with an ultraviolet-light absorber.

34. The process of claim 33 wherein the ultraviolet-light absorber is a benzotriazole ultraviolet-light absorber.

35. The process of claim 34 wherein the benzotriazole ultraviolet-light absorber is 2-(2-hydroxy-5-t-octylphenyl)-benzotriazole.

36. The process of claim 31 wherein the polymer is further combined with from about 0.05% to about 0.5% of an ultraviolet-light absorber.

37. The composition of claim 35 further comprising one or more poly(dimethylglutarimides).

38. The composition of claims 36 or 37 wherein the poly(dimethylglutarimide) is a copolymer containing units derived from N-methyldimethylglutarimide and from methyl methacrylate.

* * * * *